US005517871A

United States Patent [19]
Pento

[11] Patent Number: 5,517,871
[45] Date of Patent: May 21, 1996

[54] PROCEDURE FOR SIMULATING TABLET COMPRESSION

[75] Inventor: Tapio Pento, Helsinki, Finland

[73] Assignee: Tensor Oy, Helsinki, Finland

[21] Appl. No.: 187,409

[22] Filed: Jan. 27, 1994

[30] Foreign Application Priority Data

Jan. 28, 1993 [FI] Finland .................................. 930353

[51] Int. Cl.$^6$ ............................ G01N 19/00; G01B 5/00; G06G 7/48
[52] U.S. Cl. .................... 73/865.900; 364/476; 364/552; 264/40.5; 264/40.1
[58] Field of Search ......................... 73/865.900, 866.0, 73/865.8; 425/345; 264/40.1, 40.5, 109, 123; 364/476, 552

[56] References Cited

U.S. PATENT DOCUMENTS

| | | | |
|---|---|---|---|
| 4,030,868 | 6/1977 | Williams | 364/476 |
| 4,099,239 | 7/1978 | Williams | 364/552 |
| 4,100,598 | 7/1978 | Stiel et al. | 364/476 |
| 4,570,229 | 2/1986 | Breen et al. | 264/40.1 |
| 4,680,158 | 7/1987 | Hinzpefer et al. | 264/40.5 |
| 4,817,006 | 3/1989 | Lewis | 364/476 |
| 4,823,658 | 4/1989 | Spicer | 83/74 |
| 5,148,740 | 9/1992 | Arndt et al. | 425/345 |
| 5,156,854 | 10/1992 | Yamada | 425/78 |
| 5,202,067 | 4/1993 | Solazzi et al. | 264/109 |
| 5,211,964 | 5/1993 | Prytherch et al. | 425/149 |
| 5,229,044 | 7/1993 | Shimada et al. | 264/40.5 |
| 5,288,440 | 2/1994 | Katagiri et al. | 264/40.1 |
| 5,395,565 | 3/1995 | Nagaoka et al. | 264/40.5 |

FOREIGN PATENT DOCUMENTS

| | | | |
|---|---|---|---|
| 15801 | 1/1984 | Japan | 73/865.900 |

OTHER PUBLICATIONS

Frank W. Goodhart, Gustavo Mayorga, Mortimer N. Mills, Fred C. Ninger; *Instrumentation of a Rotary Tablet Machine*, Journal of Pharmaceutical Sciences, 1968; pp. 1770–1775.

C. J. de Blaey, J. Polderman; *Compression of Pharmaceuticals I. The Quantitative Interpretation of Force–Displacement Curves*, Pharm. Weekblad 105, 1970; pp. 241–250.

P. Ridgway Watt; *Tablet Press Instrumentation*, Manufacturing Chemist Jun. 1983; pp. 58–61.

Ph. Van Aerde, L. Boullart, R. Van Severn; *A. Microprocessor—Based Data Acquisition and Processing System for Studying Powder Compression in a Single Punch Tabletting Machine*, Pharm. Ind. 1984; pp. 1068–1072.

Von P. C. Schmidt, U. Tenter; *Displacement Measurements of Rotary Presses*, Pharm. Ind. 1985; pp. 426–430.

Von P. C. Schmidt, U. Tenter, J. Hocke; *Force and Displacement Characteristic of Rotary Tabletting Machines/1st Comm.; Instrumentation of a single punch for force measurements*, Pharm. Ind. 1986; pp. 1546–1553.

*Primary Examiner*—Hezron E. Williams
*Assistant Examiner*—Daniel S. Larkin
*Attorney, Agent, or Firm*—Merchant, Gould, Smith, Edell, Welter & Schmidt

[57] ABSTRACT

The invention concerns a procedure for simulating a desired tablet pressing situation, the tablet compound being placed in a pressing matrix in the device and the compound being compressed with the aid of punch members provided in the device on opposite sides of the matrix, in accordance with a preselected motion path, in the procedure being measured forces acting on at least one punch member of the tablet press during pressing and/or the motion path of the punch member; the results of measurment thus obtained being transferred to a computer controlling the operation of the trial tablet press, and a file being formed thereof; during such simulation the motion path of the punch members in the trial tablet press being controlled in accordance with the file formed of the results of measurement.

4 Claims, 3 Drawing Sheets

PROCEDURE FOR SIMULATING TABLET COMPRESSION

BACKGROUND OF THE INVENTION

1. Field of the Invention

The present invention concerns a procedure for simulating any desired tablet compressing operation, a tablet being pressed of the tablet compound in a trial tablet pressing apparatus.

2. Brief Description of the Background Art

At present, development and set-up for production of a new tablet formulation is most often a cumbersome and time-consuming process. Usually, formulation of the tablet which is being developed is first done with an excenter tabletting machine, then with a small rotation machine, and finally with a big production rotation machine. Therefore, in the worst case, the formulation has to be completely redone several times, owing to the different compressing characteristics of the different machines.

Presently, trial tabletting apparatus are available, referred to as tablet pressing simulators. Devices of this type are experimental presses in which the tablet compound is placed in a pressing matrix, into which from above and from below two punch members are guided to press the compound into a tablet. The motion paths of the punch members during the pressing operation are controlled to be consistent with arbitrarily selected motion paths. Usually, a downward convex step function or a sinusoidal curve is used for a motion path.

The simulation method applied by existing experimental presses is not applicable e.g. in the work serving formulation of the tablet compound because the movements of the punch members of the press are not consistent with the true compression event. It is known that the movements of the punch members, as a function of time, depends among other things on the type, model and production rate of the press which is being used, on the types of punches and matrix, on the characteristics of the material to be compressed, and on the size and shape of the tablet. Sinusoidal punch motions are not even a rough approximation of actual punch motions, and therefore they do not in any way correspond to the true motions of the punches in a press during the precompression, compression and ejection steps. In fact, trial press devices which are called simulators do not at all simulate the compression taking place in tablet presses. Therefore the results derived with their aid are, even at best, durbious as to their significance and interpretation. Owing to the simulating method applied, the practical value of such trial tablet presses is minimal, as is well indicated by the fact that their total number in the whole world is about ten units.

SUMMARY OF THE INVENTION

The object of the present invention is to eliminate the drawbacks mentioned in the foregoing.

The object of the present invention is specifically to disclose a procedure enabling any tablet pressing to be simulated with case and more accurately than heretofore, such as takes place in various kinds of tablet pressing apparatus used in research and production.

The object of the invention is further to disclose a procedure by which, for instance, the work involved in a new tablet formulation and the transfer into production thereof can be speeded up and facilitated, compared with what has been possible heretofore.

In the procedure of the invention, from the punch members installed on opposite sides of the press matrix in the tablet pressing apparatus of which one desires to simulate the tablet pressing situation are measured with the aid of transducers measuring force and/or displacement, respectively, the forces acting during pressing operation on at least one of said punch members and/or the motion path of the punch member; the results of the measurements thus obtained are transferred to a computer controlling the operation of the trial tablet press device, and a file is composed thereof; during simulation the motion paths of the punch elements in the trial tablet press are controlled with the aid of the computer to conform to the file composed of the results of the measurement.

The simulating procedure of the invention can be implemented in connection with any tablet pressing method whatsoever which is based on compression. The invention affords several advantages over methods employed in existing trial presses. In the procedure of the invention, the formulation to be done with a trial tablet pressing simulator can be worked out directly for the production rotation machine, whereby the working out of unnecessary intermediate formulations is obviated. A procedure can also be applied in checking and calibrating the operation of tablet presses. It is also possible with the aid of the procedure to solve problems occuring on one or another of the production tablet presses, without having to shut the production down, by using a simulator in the investigation, which is controlled as taught by the procedure to press tablets in the same manner as the particular press does.

According to an advantageous embodiment of the procedure forces acting on both punch members and the motion paths of the punch members in the tablet press of which the tablet pressing situation one desires to simulate are measured with the aid of transducers measuring force and displacement, disposed in conjunction with them.

The transducers measuring force and/or displacement are commercially known. In the invention can be employed any transducer appropriate to the purpose, known in itself in prior art. Advantageously, at least a transducer measuring displacement is used. In the procedure, the transducer is connected, in accordance with practice known in itself in measuring technology, to measuring electronics, and the results of measurement therefrom obtained may be transferred to the computer controlling the trial tablet press, in a way known in itself in the art.

In the procedure of the invention the simulation can be implemented in that the motion path of the punch members in the trial tablet press is controlled exclusively on the basis of the results of measurement from the tablet pressing device or, alternatively, in the control are in addition to the results of measurement from the tablet press also used results of measurement obtained by measuring, during operation of the trial tablet press, forces acting on at least one punch member of the press and/or the motion path of the punch member with the aid of transducers placed in conjunction with the member and measuring force and/or, respectively, displacement in the latter instance, preferably, forces acting on both punch members of the trial tablet press and the motion paths of the punch members are measured with the aid of transducers disposed in conjunction with said members and measuring force and displacement.

Advantageously, the motion path of the punch members of the trial tablet press are controlled to be substantially consistent, or even identical, with the motion paths of the punch members of that tablet press of which one desires to simulate the tablet pressing situation. The motion paths may also be controlled in another way.

The procedure of the invention can be implemented with existing apparatus by installing therein transducers measuring force and/or displacement which are connected to measuring electronics. The procedure can also be implemented with a measuring system consisting of a press matrix and punch members provided with a force and displacement transducer connected to measuring electronics, and which is installable in existing trial tablet presses and in the tablet presses proper.

The measurement and the simulation are advantageously implemented using one and the same punch member and press matrix system. The invention is implemented with particular advantage using a trial tablet press device including a detachable measuring system consisting of a press matrix and punch members provided with a force and displacement transducer connected to measuring electronics, in such manner that the measuring system can be installed on the tablet press of which one desires to simulate the tablet pressing situation for obtaining said results of measurement, and which can be put back in the trial tablet press in order to simulate the tablet pressing done with the tablet press proper, with the aid of the results of measurement that have been obtained.

BRIEF DESCRIPTION OF THE DRAWING

The invention is described in the following with the aid of an example, referring to the accompanying figures, where.

BRIEF DESCRIPTION OF PREFERRED EMBODIMENTS

Figure 1:
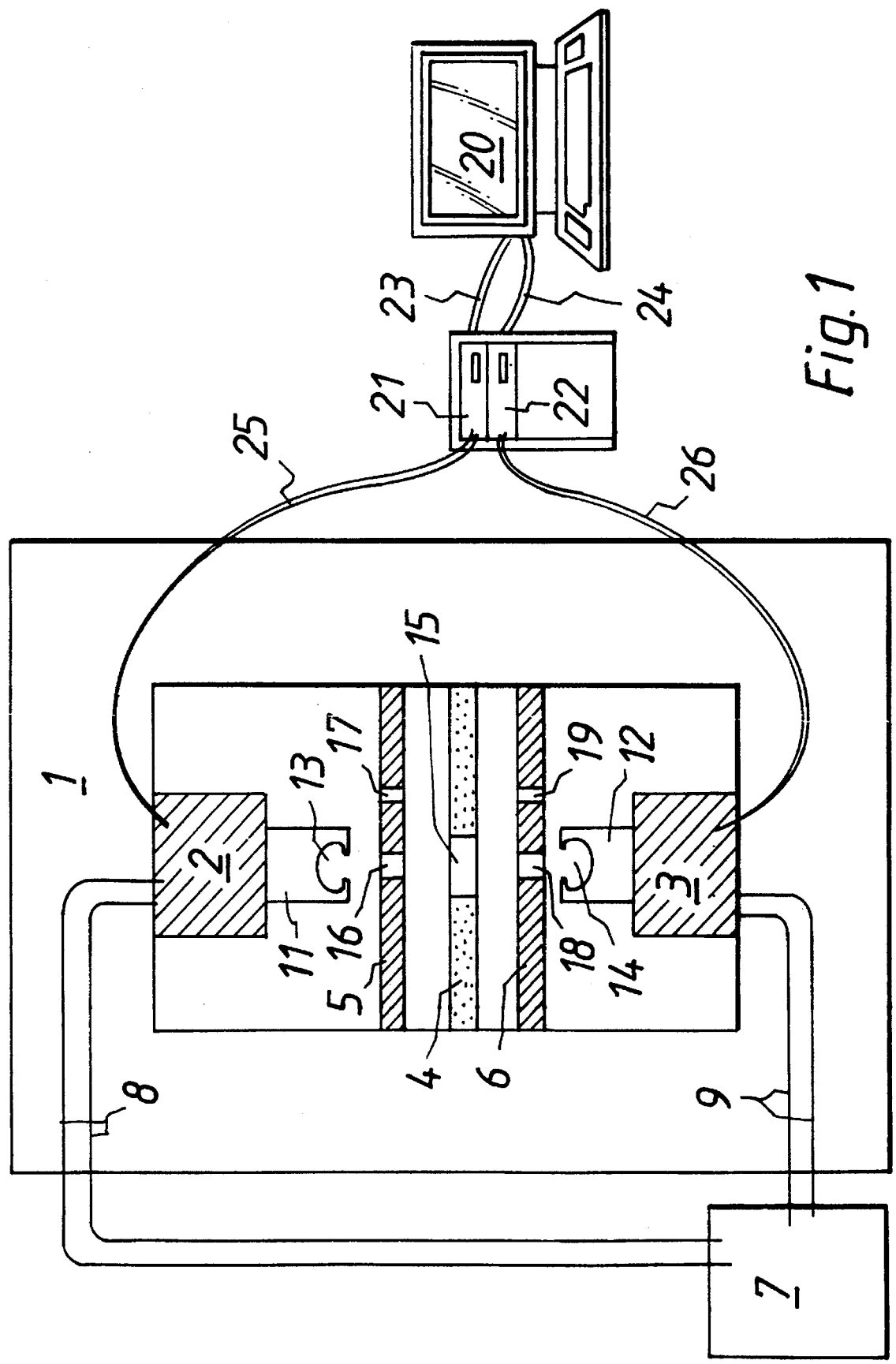
FIG. 1 presents the simulator as an overall drawing.

In the example, the punch member is referred to as a punch. Furthermore, in the example is measured both the force acting on the punches in compression and the displacement of the punches. The procedure of the invention can also be implemented by measuring displacement only. In FIG. 1 is schematically depicted a trial tablet press, a tablet simulator, to the frame 1 of which has been attached, in accordance with common practice, an upper cylinder unit 2, a lower cylinder unit 3, a matrix table 4, and upper and lower punch planes 5,6. The driving power for the cylinder units 2,3 is produced in a pump 7, whence it is carried in the form of pressurized oil to the cylinder units 2,3 along pipelines 8,9, as is well-known. With the aid of valves and hydraulic expansion tanks contained in the upper cylinder unit 2, the upper punch base 11 is moved vertically, and with the aid of valves and hydraulic expansion tanks contained in the lower cylinder unit 3, the lower punch base 12 is moved vertically. On the upper punch base 11 is provided a holder 13 for the punch, and the lower punch base 12 comprises a similar holder 14 for the lower punch.

Control of the motion paths of the punches is effected with the aid of a computer 20. For control of the motion paths of holders 13,14, the computer 20 contains a control file, which is converted in upper and lower control electronics units 21,22 into signals controlling the valves of the cylinder units 2,3. Signal traffic between the computer 20, the control units 21,22 and the cylinder units 2,3 is by fixedly connected cables 23,24, 25,26. The principle of the implementation here presented represents practice known in itself in the art.

In the matrix table 4 an apperture 15 is provided, in which various pressing matrices can be placed. The upper punch plane 5 presents an aperture 16 in which various press punches mounted in a holder can be placed, and an aperture 17, in which a displacement measuring transducer can be placed. The lower punch plane 6 presents similar apertures 18,19.

Figure 2:
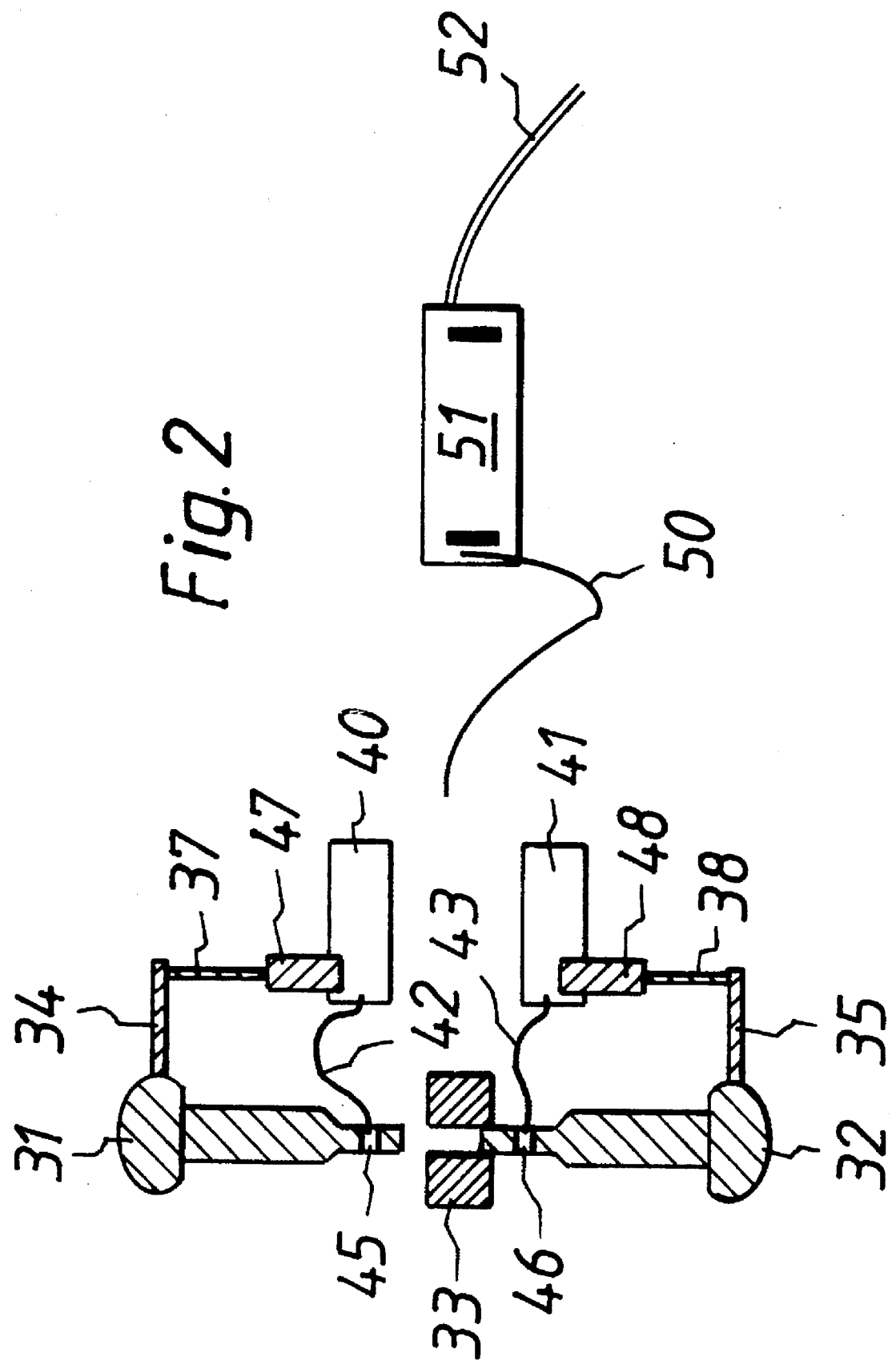
FIG. 2 presents the measuring instrumentation with its components.

In FIG. 2 is schematically presented a tablet pressing measuring system with an upper punch 31 and a projection 34 thereto attached, a lower punch 32 and a projection 35 thereto attached, and a pressing matrix 33. The motion path of the upper punch 31 is measured with a displacement transducer 47 known in itself in the art, its measuring stem 37 being moved by the projection 34 as the upper punch moves. Similarly, the motion path of the lower punch 32 is measured with a displacement transducer 48 known in itself in the art, its measuring stem 38 being moved by the projection 35 as the lower punch moves. The displacement transducers 47,48 are mounted in upper and lower measuring electronics housings 40,41. The housings 40,41 are of a kind enabling them to be affixed to the rotation table of the tablet press or to the upper or lower punch planes 5,6 of the simulator. The displacement transducers 47,48 are connected to the measuring electronics contained in the housings 40,41 in a manner known in itself in the art.

The force transducers 45,46, known in themselves in the art and disposed on the upper and lower punches 31,32, which measure forces acting on the punches during various phases of the operation of tablet press or simulator, are connected, in likeness with the above, by cables 42,43 fitted with connectors, to the electronics in the housings 40,41.

The data transfer member 50 is fixedly connected to amplifier electronics 51, known from the electronics field, which is further connected to the control computer 20 by a cable 52. The data transfer member 50 transmits signals telemetrically between the electronics in the housings 40,41 and the amplifier unit 51. The member 50 may be, in the manner known from the electronics, e.g. an optical cable if the signals are transferred at optical frequencies, or an antenna if telemetry on radio frequencies is chosen.

Figure 3:
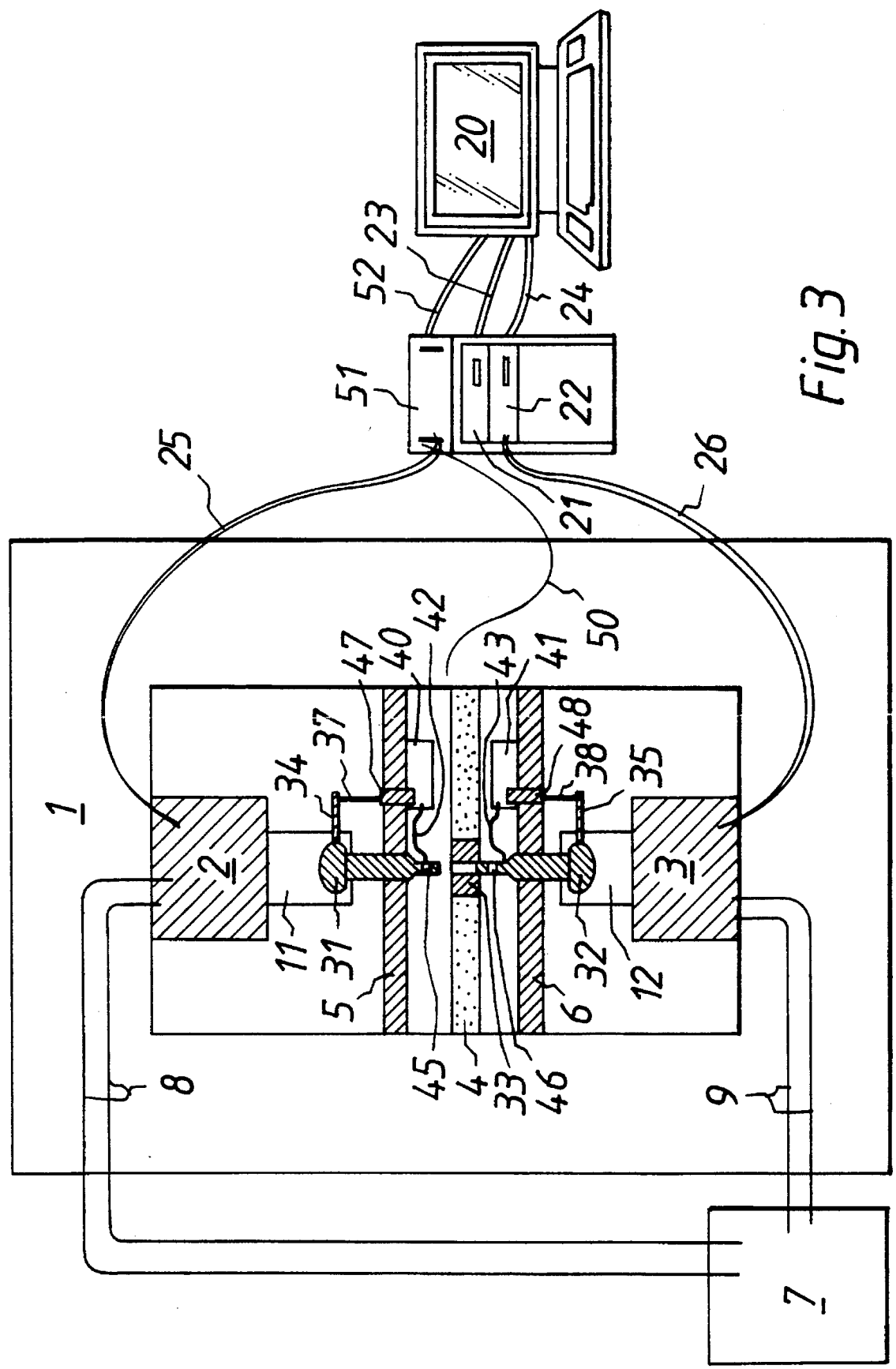
FIG. 3 presents a simulator in which instrumentation as shown in FIG. 2 has been installed.

In FIG. 3 is shown a simulator according to FIG. 1 and in which the measuring system of FIG. 2 has been installed. The upper and lower punches 31,32 and the cables 42,43 have been inserted in apertures 16,18 in the punch planes 5,6, and the punches have been mounted in the holders 13,14. In the aperture 15 of the matrix table 4 a press matrix 33 has been installed. The housings 40,41 have been so attached to the planes 5,6 that the stems 37,38 of the displacement transducers 47,48 are in contact with the projections 34,35. The cables 42,43 of the force transducers 45,46 are connected to the electronics in the housings 40,41. The data transfer member 50 has been installed close enough to the housings 40,41 so that telemetry from the electronics in the housings 40,41 to the amplifier unit 51 and vice versa is enabled, and the cable 52 of the amplifier unit 51 is connected to the computer 20.

The simulation procedure using the apparatus depicted in FIGS. 1 and 2 operates as follows, for instance. The measuring system of FIG. 2 and the computer 20 are installed on a tablet press. The installation is carried out in the manner shown in FIG. 3, so that to the planes 4,5,6 correspond the matrix, upper and lower punch planes of the rotation table of the tablet press, to the apertures 16,18 correspond the apertures of a pair of punches in the rotation table, and to the apertures 17,19 correspond the apertures of the pair of punches adjacent to that pair of punches. Once the measuring system has been installed on the tablet press, measurements can be performed with its aid during operation of the press.

While the press is in operation, the results of the measurements relating to the pressing of one or several tablets are collected in the computer 20. In this way a file is created, containing the motion paths of the upper and lower punches 31,32, measured by the displacement transducers 47,48 during times of the prepressing, pressing and ejection steps of the tablet pressing process (in μm per unit time), and the compression force paths at corresponding times acting on the upper and lower punches 31,32 measured by the force transducers 45,46 (in N per unit time). Measurements have been made frequently enough, e.g. 2–3 times within one millisecond.

Measurements are made on different tablet presses, and in each one of them at various settings of the press, for instance the speed of operation, the tablet thickness and the material to be processed into tablets are varied, as well as the punches 31,32 and the matrix 33. In this manner files are collected in the computer 20 which discribe the functioning of each tablet press during various pressing events. In a preferred embodiment, the speeds of the punch members in the simulator are less than 600 mm/s, the maximum accelerations are at least 20 m/s$^2$, and the maximum compression forces are 20–100 kN.

On concluded measurements the measuring system depicted in FIG. 2 is installed on a simulator as shown in FIG. 3.

The procedure may equally be implemented in that transducers measuring force and/or displacement, as described above, are installed on an existing tablet pressing machine proper and, if required, on an existing simulator. Alternatively, one may use a measuring system as described above, which can be installed on an existing tablet pressing machine proper or on the simulator.

When the simulator is used, for instance, in developing a new formulation of active medicament and excipients, the first thing to do is to select the tablet press on which one desires to carry out the future production of that formulation, and the desired production rate of the press. Next are selected the desired tablet size and shape and the corresponding, appropriate punches. Next, a previously created file is found in the computer 20 which has been prepared with the press, punches and rate in question and with a material and size corresponding to the compound which one has in mind. If there is no such file, one may either use the closest equivalent or make a separate run to produce, in the manner described, a few tablets in order to produce exactly the desired file.

Developing the formulation is for instance accomplished in that in the matrix 33 is placed the desired quantity of the material under study, whereafter the computer 20 controls the motion paths of the punch bases 11,12 to conform to the file in use. The control takes place in that the control electronics units 21 and 22 convert the motion paths coming from the file of the computer 20 to signals by means of which the valves in the cylinder units 2,3 are opened and closed, these valves in their turn controlling the vertical motion paths of the punch bases 11 and 12. Checking of the control and its correction are performed by comparing the motion paths of the punches 31,32 produced by the transducers 47 and 48 during compression, with the motion paths in the file. The alternative is to check and correct the ensuing force/time path by comparing it with the force/time path in the file. In both cases control adjustment is effected by changing the motion paths of the punches.

The invention may be applied in accordance with the principle above described also in simulating a tablet pressing procedure in which the pressing is efected by moving only one of the two punch members while the other punch member operates e.g. as a fixedly stationary counter-member.

I claim:

1. A procedure of a tablet compound being pressed into a tablet in a desired tablet press by using a trial tablet press which simulates the tablet compound being pressed into the tablet in the desired tablet press, so that the desired tablet press is controlled to conform to measured movements obtained from the trial tablet press, wherein in the desired tablet press, the tablet compound is placed in a pressing matrix of a desired tablet pressing device, the tablet compound is compressed by punch members, provided by a trial tablet pressing device, on opposite sides of the pressing matrix of the desired tablet pressing device, and wherein a motion path of each of the punch members is in accordance with a predetermined motion path, the procedure comprising the steps of:

providing a displacement transducer for each of the punch members of the trial tablet pressing device, each displacement transducer being in conjunction with each of the punch members;

installing the punch members on opposite sides of a pressing matrix of the trial tablet pressing device;

placing the tablet compound in the pressing matrix of the trial tablet pressing device;

pressing the tablet compound by the punch members;

measuring a motion path of at least one of the punch members during pressing of the trial tablet press by at least one of the displacement transducers;

transferring results of measurements obtained from at least one of the displacement transducers to a computer which controls an operation of the trial tablet press;

forming a file in the computer;

controlling the motion path of at least one of the punch members in the trial tablet press by the computer in accordance with the file formed;

installing the punch members in the desired tablet pressing device on opposite sides of the pressing matrix of the desired tablet pressing device;

placing the tablet compound in the pressing matrix of the desired tablet pressing device;

pressing the tablet compound in the desired tablet press;

measuring the motion path of at least one of said punch members during pressing of the desired tablet press by at least one of said displacement transducers;

transferring results of measurements obtained from at least one of the displacement transducers to the computer which controls an operation of the desired tablet press; and controlling the motion path of at least one of the punch members in the desired tablet press by the computer by using the results of measurements obtained from the displacement transducers in the desired tablet press together with the results of measurements obtained from the trial tablet press.

2. Procedure according to claim 1, further comprising steps of:

providing a force transducer for each of said punch members, each force transducer being disposed on each of said punch members; and measuring forces which act on at least one of said punch members in the trial tablet press; and transferring results of measurements of forces to the computer.

3. Procedure according to claim 1, wherein a speed of each of the punch members is less than 600 mm/s, a maximum acceleration of each of the punch members is at least 20 m/s$^2$, and a maximum compression force of each of the punch members is 20–100 kN.

4. Procedure according to claim 2, wherein a speed of each of the punch members is less than 600 mm/s, a maximum acceleration of each of the punch members is at least 20 m/s$^2$, and a maximum compression force of each of the punch members is 20–100 kN.

* * * * *